(12) United States Patent
Dupont

(10) Patent No.: US 7,390,580 B1
(45) Date of Patent: Jun. 24, 2008

(54) METAL DETECTABLE GASKET

(75) Inventor: Robert Dupont, Blairstown, NJ (US)

(73) Assignee: Rubber Fab Gasket & Molding, Inc., Andover, NJ (US)

(*) Notice: Subject to any disclaimer, the term of this patent is extended or adjusted under 35 U.S.C. 154(b) by 281 days.

(21) Appl. No.: 11/161,876

(22) Filed: Aug. 19, 2005

(51) Int. Cl.
B32B 15/00 (2006.01)

(52) U.S. Cl. ................ 428/692.1; 428/689

(58) Field of Classification Search ........... 428/692.1
See application file for complete search history.

(56) References Cited

U.S. PATENT DOCUMENTS

| | | | |
|---|---|---|---|
| 2,985,470 A | 5/1961 | Hirsch | |
| 4,137,361 A * | 1/1979 | Deffeyes et al. | 428/328 |
| 4,470,609 A * | 9/1984 | Poe | 285/334.2 |
| 4,486,037 A * | 12/1984 | Shotbolt | 285/261 |
| 4,531,532 A | 7/1985 | Zimmerly | |
| 4,563,381 A | 1/1986 | Woodland | |
| 4,568,115 A | 2/1986 | Zimmerly | 285/411 |
| 5,749,586 A | 5/1998 | Makote | |
| 5,790,246 A * | 8/1998 | Kuhnell et al. | 356/72 |
| 5,823,222 A * | 10/1998 | Minshull et al. | 137/15.15 |
| 5,904,382 A | 5/1999 | Bronnert | 285/349 |
| 5,971,399 A | 10/1999 | Hashimoto | 277/314 |
| 5,996,966 A | 12/1999 | Zimmerly | |
| 6,228,933 B1 * | 5/2001 | Hiles | 524/590 |
| 6,476,113 B1 * | 11/2002 | Hiles | 524/439 |
| 6,857,638 B2 * | 2/2005 | Dupont et al. | 277/608 |
| 6,877,527 B2 * | 4/2005 | Dupont et al. | 137/614.01 |
| 6,927,058 B1 * | 8/2005 | Dupont | 435/287.4 |
| 2004/0160018 A1 * | 8/2004 | Dupont et al. | 277/628 |
| 2005/0167931 A1 * | 8/2005 | Aisenbrey | 277/650 |
| 2006/0169943 A1 * | 8/2006 | Yamaguchi | 252/62.54 |

* cited by examiner

Primary Examiner—Carol Chaney
Assistant Examiner—Gary Harris
(74) Attorney, Agent, or Firm—Howard R Popper

(57) ABSTRACT

A method of preventing particles of elastomeric material employed as seals or spacers in a sanitary piping system from entering the product stream, comprising applying an effective amount of comminuted iron powder to the elastomeric base material prior to forming said material into said seals or spacers, magnetically sensing said particles in said piping system; and responsive to said magnetic sensing diverting a portion of said product stream containing said particles.

4 Claims, 3 Drawing Sheets

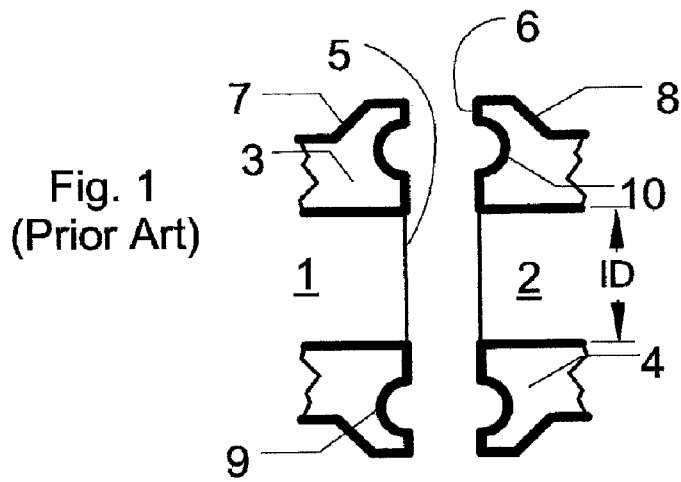
Fig. 1
(Prior Art)
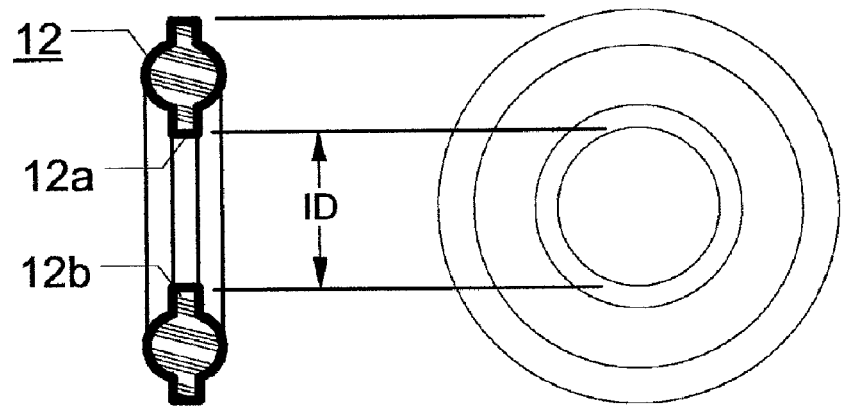
Fig. 2
(Prior Art)
Fig. 3
(Prior Art)
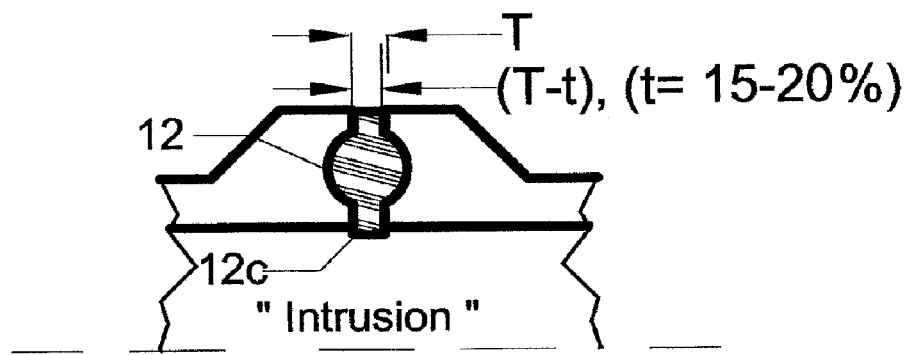
Fig. 4
(Prior Art)

METAL DETECTABLE GASKET

FIELD OF THE INVENTION

This invention relates to sanitary fittings for pipes of the type employed in the food processing and pharmaceutical industries and, more particularly, to gaskets, valves and valve seats employing compressible elastomeric materials for sealing said pipes against leakage of the fluids carried therethrough.

BACKGROUND OF THE INVENTION

Plants processing foods, pharmaceuticals, biological and technological fluid materials generally require fluid piping systems that must be free from voids and crevices to prevent accumulations of materials, that can readily be taken apart for periodic cleaning and that can withstand the application of CIP (clean in place) solutions and steam cycles used for cleaning. The gasket material used at joints in the piping systems must have appropriate resiliency and resistance against deterioration by the chemical and physical characteristics of the fluids under the conditions of temperature and pressure occurring during santization, such as the use of 15 psi saturated steam, hot, de-ionized water or hot WFI (water for injection).

As compared to a general use gasket, the material for a sanitary-pipe gasket to be used in manufacturing medicines, foods, etc. must be more carefully selected. This requirement is made to prevent contamination of products by components of the gasket material eluting into the fluid transported through the piping. Accordingly, many sanitary-pipe gaskets have conventionally been formed of silicone rubber which has excellent heat resistance and chemical resistance. Other materials employed in food and pharmacological processing include ethylene propylene diene monomer (EPBM), buna rubber, and fluoroelastomers such as Viton® or FKM 615A™ a dipolymer of vinylidene fluoride and hexafluoroproplyene often used as base elastomers for seals, spacers and gaskets employed in sanitary piping systems In addition to gaskets, elastomeric materials in various configurations are used in the food and pharmacological processing industries. For example, U.S. Pat. No. 2,985,470 illustrates the use of conical gaskets machined from polymeric tetrafluoroethelene. U.S. Pat. No. 4,531,532 illustrates the use of elastomeric materials in valve stems, seats and seals employed in sanitary fittings. Assembly and disassembly of sanitary pipe sections is facilitated by using flanged pipe ends held together by hinged clamps rather than by threaded coupling, as shown in U.S. Pat. No. 4,568,115. Gaskets in the form of O-rings for sealing the flanged ends of sanitary piping against leakage are shown in U.S. Pat. Nos. 5,904,382 and 5,971,399.

The '382 patent noted that the gasket shown in the '470 patent was subject to being objectionably deformed when clamped between opposed ends of the pipes of a pipe fitting so that it became unusable after several uses. In an attempt to make the gasket re-usable, the '399 patent resorted to a gasket made of porous, composite materials having different densities and which were differently compressible, so as to offer both effective sealing as well as resistance to cold flow.

In my recent U.S. Pat. No. 6,857,638 issued Feb. 22, 2005 I disclose a gasket for establishing a seal between the flanges of sanitary pipe fittings which comprises an O-ring portion of elastomeric material and an incompressible ring member bonded to the O-ring portion to limit compression of the elastomeric material so that it is prevented from intruding into the lumen of the pipe when the fitting is made up. This feature is achieved by dimensioning the axial thickness of the incompressible portion with respect to the axial thickness and percentage radial expansion of the elastomeric portion so as to limit its axial compression to an amount that takes into account the fact that its percentage radial expansion is greater than its percentage of axial compression by the factor $(1/(1-t/T))$, where t is the amount of compression and T is the uncompressed axial thickness.

The foregoing patents have been concerned with maintaining an appropriate seal at the joints between piping sections to guard against the introduction of contaminants as well as the accumulation of processed materials at the gasketed joints. In addition, current standards of practice dictate that product purity be monitored to detect the presence of foreign matter in the process stream such as extraneous metals arising from broken machinery or processing equipment components. As expressed in the Federal Register (Vol. 51, No. 118): "Effective measures shall be taken to protect against the inclusion of metal or other extraneous material in food. Compliance with this requirement may be accomplished by using sieves, traps, electric metal detectors or suitable means."

A common form of metal detector uses a balanced three-coil arrangement which is positioned to surround a section of pipe to sense metal moving through it. The center (oscillator) coil emits an electromagnetic field throughout the space within the metal detector housing. Two receiver coils (placed equidistant on either side of the oscillator coil) are connected in series so that the energy coupled from the oscillator coil to either of the receiver coils exactly cancels the energy coupled to the other receiver coil; the net output of this pair is essentially zero. Metal passing through this set of coils creates an imbalance which can be detected. For example, one standard of metal detector sensitivity is the ability to detect a metallic ball 1.5 mm in diameter mixed in with the process stream of normally product.

However, while such metal detectors may be able to detect the presence of ferrous and non-ferrous metals, other foreign matter, such as pieces of plastic or rubber will pass through undetected. One source of such foreign matter may be attributed to the wear and tear of the non-ferrous elastomeric materials used in gaskets, coated valve stems and seals exposed to the process stream but which also must withstand the high temperature steam periodically used to clean the piping systems. To detect such non-magnetic materials in the process stream expensive x-ray detection or gamma ray spectrometry apparatus has heretofore been required. X-ray systems can reliably detect metal, bone, grit, glass and some plastics (if thick enough).

SUMMARY OF THE INVENTION

In accordance with the principles of the invention the presence of particles breaking off from degraded gaskets or seals and which might enter the product stream are caused to be magnetically detectable by incorporating an effective amount of finely comminuted iron powder into the elastomeric material before it is molded and cured into its ultimate configuration. The comminuted iron powder incorporated into the gasket material is in an amount sufficient to trigger magnetic detectors monitoring the sanitary piping system without deleteriously affecting the resiliency or hardness of the cured elastomeric material.

BRIEF DESCRIPTION OF THE DRAWING

The foregoing and other objects and features of the present invention may become more apparent from a reading of the ensuing description together with the drawing in which:

FIG. 1 shows prior art sanitary pipe fittings equipped with flanges for receiving an O-ring sealing gasket;

FIGS. 2 and 3 show cross-section and plan views of a prior art gasket for use with the sanitary fittings of FIG. 1;

FIG. 4 shows a section through the joint between prior art sanitary fittings using the prior art gasket demonstrating a typical intrusion of a portion of the gasket into the pipe lumen;

DETAILED DESCRIPTION

Figures 5, 6:
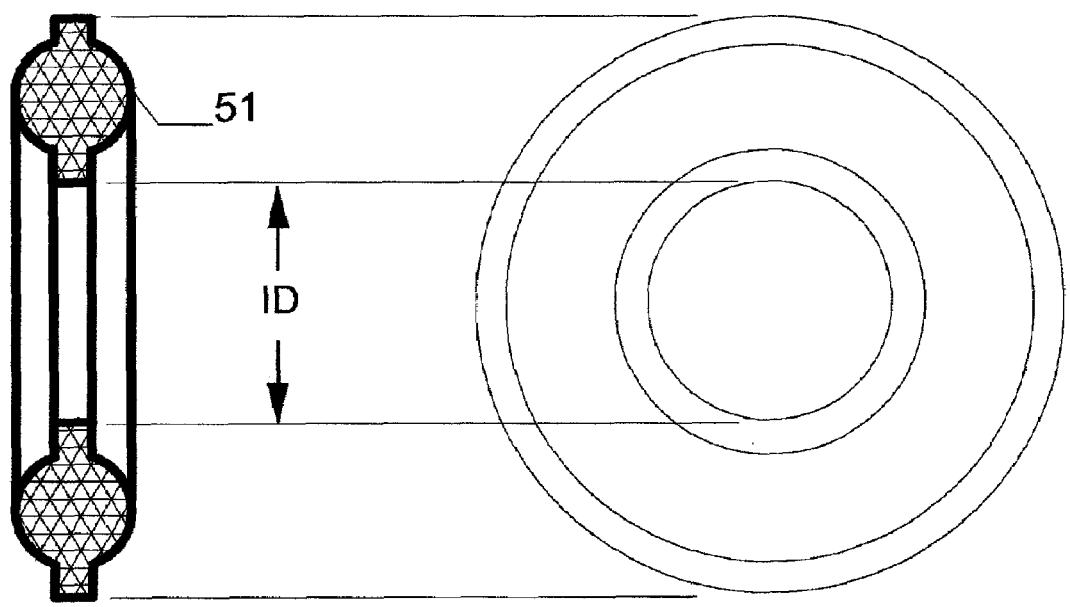
FIGS. 5 and 6 are cross-section and plan views of the improved gasket of the invention having distributed therethrough finely comminuted ferromagnetic material.

A pair of prior art pipe ends equipped with sanitary pipe flange fittings 1, 2 is shown in FIG. 1. Sanitary pipe fittings 1, 2 have flanges 3, 4 with substantially flat facing faces 5, 6 each of which has a recess or annular groove 9, 10 that is designed to accommodate sealing gasket. Typically, a simple O-ring gasket (not shown) or preferably, an O-ring 12, FIGS. 2, 3, fitted with peripheral flat, compressible sections 12a, 12b of elastomeric material, such as shown in U.S. Pat. No. 6,318,576, may be used. Let it be assumed that the original thickness of portions 12a, 12b is "T".

The pipe fittings are made-up by tightening the screw (not shown) of a conventional hinged clamp (not shown, but see U.S. Pat. No. 4,568,115). The hinged clamp exerts a camming action on the exterior beveled shoulders 7, 8 of flanges 3, 4 forcing flat faces 5, 6 against each other and compressing the gasket 12 (FIG. 2) between them.

Unfortunately, as shown in FIG. 4, if the clamp is tightened too much in an effort to prevent leakage at the joint, the gasket 12 will be unduly compressed causing a portion 12c of gasket 12 to be extruded into the interior lumen ID at the joint between pipes 1, 2. Empirical data tends to show that with an elastomeric gasket typically having a Shore A hardness of 70°, a minimum contact pressure of 1.5 N/mm$^2$ is required. This contact pressure corresponds to an elastomeric gasket being compressed by 15 percent of its original thickness.

When a gasket is fabricated of elastomeric material, compressing one dimension of the gasket results in expansion of its other dimension, but the total volume of gasket material remains constant. For example, a 20% axial compression of the gasket thickness will cause a radial elongation of about 25%. Depending on the dimensions of the pipe flanges and that of the gasket, the radial elongation of the gasket 12 may cause portion 12c to be extruded into the pipe lumen. Projecting portion 12c can then be abraded by the flow of material being carried through the sanitary pipes.

This is shown in FIG. 4 where a conventional gasket 12 made of elastomeric material has a pre-compression axial thickness T. When the usual clamp (not shown) is made up to draw the pipe sections axially together gasket 12 is compressed by an amount t so that its final thickness is T−t. At the same time its radial dimension increases. Depending on the amount of compression, the amount of radial increase may cause a portion 12c of the gasket to be extruded into the lumen of the pipe. It is this portion 12c of the gasket that is exposed to the process stream being carried by the pipes.

To comply with sanitary requirements, sanitary piping systems are periodically subjected to high temperature steam sterilization. Under such conditions, gaskets tend to deteriorate. The deterioration leads to a lowering of elasticity, the gasket becomes stiff and cracks form. When the piping system is then used to carry a process stream a portion of the gasket surface 12c may erode so that some small particles thereof become detached and enter and contaminate the process stream.

While modern elastomeric materials are designed to resist deterioration under operating conditions, there needs to be some way of telling when a gasket has in fact deteriorated to the point where it contaminates the process stream. Unfortunately, the detection of miniscule portions of elastomeric material in the process stream has required exotic spectrographic equipment. However, in accordance with an aspect of the present invention, as shown in FIGS. 5 and 6, elastomeric gaskets or seals having incorporated finely comminuted ferromagnetic particles prior to being molded will enable inexpensive metal detection equipment monitoring the process stream to detect the presence of any detached or separated particles of deteriorated gasket material. FIGS. 5 and 6 show cross-sectional and plan views of elastomeric material formed as a molded O-ring gasket 51 having incorporated therein finely comminuted ferromagnetic particles.

An example of the proportion of elastomeric base material used in fabricating 50 durometer silicone rubber magnetic detectable gaskets is shown in the following table:

| 50 Durometer Silicone Rubber with Comminuted Iron Powder | Batch = 60 lbs. |
|---|---|
| Base: Elastosil 160 ® Silicone Rubber | Ingredient Weight |
| 35 durometer Elastosil 160 ® | 35 lbs |
| 75 durometer Elastosil 160 ® | 75 lbs |
| Curing Agent (2,4-dichlorobenzyl peroxide) | 375 grams |
| Pigment | 250 grams |
| Reduced Iron Powder | 25 lbs |

Proportions for magnetic detectable gaskets fabricated of ethylene propylene diene monomer (EPBM), buna rubber, and fluoroelastomers such as Viton® or FKM 615A™ a dipolymer of vinylidene fluoride and hexafluoroproplyene often used as base elastomers for seals, spacers and gaskets employed in sanitary piping systems are similar. The amount of reduced iron powder employed should be effective to trigger magnetic detectors monitoring the sanitary piping system while keeping the hardness of the cured elastomer in the range between 40 to 90 but preferably 50 as measured on the Shore A scale. An example of the threshold sensitivity often employed with magnetic detectors is that which can respond to the appearance of a metal ball 1.5 mm in diameter in the product stream.

The properties of an exemplary reduced iron powder to be incorporated in the base elastomeric material before being molded and cured, are summarized in the following table:

| Density (g/cc) | Iron Powder Sieve (U.S. Std.) | % | Contaminant |
|---|---|---|---|
| 2.52 | +100 | 2 | AS: <3.0 ppm |
| 2.52 | 100/+325 | Balance | HG: <0.025 ppm |
| 2.52 | −325 | 17 | lead: <10 mg/kg |

Figure 7:
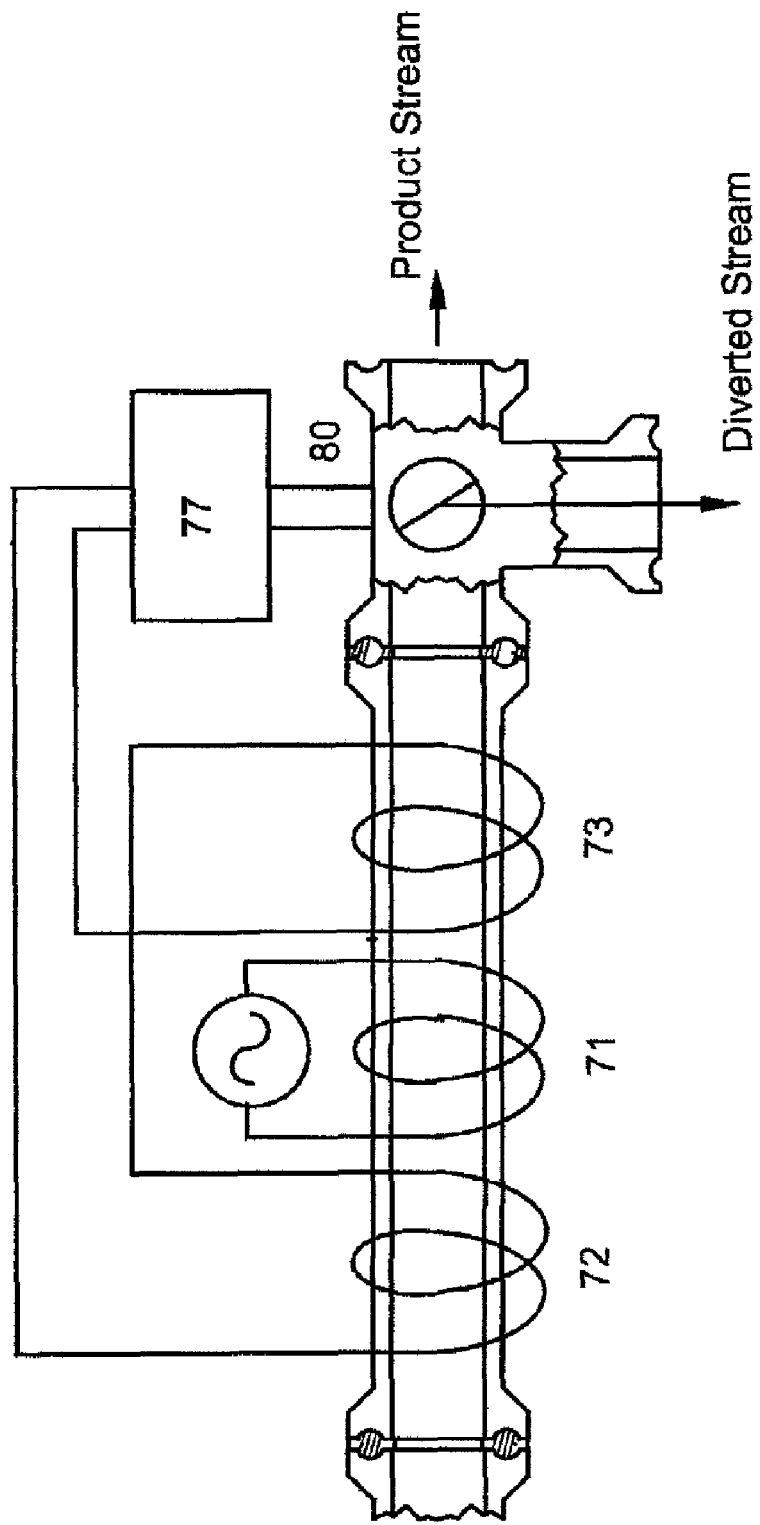
FIG. 7 is a schematic diagram of a metal detector installed in a sanitary piping system including a diverting valve actuated by the metal detector to remove contaminated product from the process stream.

FIG. 7 shows a common form of metal detector employing a balanced three-coil arrangement surrounding a section of sanitary piping carrying a product stream. Coil 71 is connected to a source of oscillating voltage to direct an electromagnetic field throughout the space within the sanitary piping. Coils 72 and 73 placed equidistant on either side of oscillator coil 71 are connected in series so that the energy coupled from the oscillator coil to either of the receiver coils exactly cancels the energy coupled to the other receiver coil; the net output of this pair is essentially zero. If metal particles are contained in the product stream an imbalance is created. Coils 72 and 73 are connected to the input of amplifier 77. When amplifier 77 detects an unbalanced signal of sufficient amplitude its output signal activates diverter valve 80 to divert the portion of the product stream sensed as containing the magnetically detectable particles that were incorporated into the elastomeric material forming the seals or spacers used in the sanitary piping system but which had improperly entered the product stream.

What has been described is deemed to be illustrative of the principles of the invention. Further and other modifications may be made by those skilled in the art without, however, departing from the spirit and scope of the invention.

What is claimed is:

1. A gasket of compressible elastomeric material for establishing a seal between the flanges of sanitary pipes carrying a process fluid stream and for alarming of the presence of particles of said gasket causing contamination of said fluid stream from deterioration of the material of which the gasket is comprised, comprising:
    an O-ring portion and a portion having an essentially flat cross-section, said flat portion extending radially inward toward the lumen of said pipes, said flat portion having a surface exposed to said fluid stream, said compressible elastomeric material having incorporated therein an effective amount of finely comminuted ferromagnetic powder without deleteriously affecting the resiliency or hardness of the cured elastomeric material, said powder being provided in sufficient amount to trigger a magnetic detector monitoring said pipes for the presence of contamination arising from particles of said gasket becoming detached from said exposed surface and entering into said process fluid stream;
    wherein the compressible elastomeric material comprises a base elastomer selected from the group consisting of silicone rubber, fluoroelastomer, Buna rubber and EPBM.

2. A method of alarming a sanitary piping system of a deteriorated gasket occasioned by particles of elastomeric material employed as seals or spacers entering the product stream, comprising
    applying an effective amount of comminuted iron powder to the elastomeric base material prior to forming said material into said seals or spacers,
    magnetically sensing said particles in said piping system; and
    responsive to the magnetic sensing of said particles diverting a portion of said product stream containing said particles.

3. A method according to claim 2 wherein said elastomeric material has a hardness in the range of 50 to 90 as measured on the Shore A scale.

4. A method of alarming a sanitary piping system carrying a fluid stream, comprising
    inserting a gasket or seal of elastomeric material having formed therein finely comminuted iron powder, said gasket having a surface exposed to said fluid stream,
    sensing for the presence of particles of deteriorated elastomeric material in said fluid stream by magnetically detecting said particles in said piping system; and
    responsive to the magnetic sensing of said particles diverting a portion of said product stream containing said particles.

* * * * *